United States Patent Office 2,859,094
Patented Nov. 4, 1958

2,859,094

URANIUM EXTRACTION PROCESS USING SYNERGISTIC REAGENTS

John M. Schmitt, Charles A. Blake, Jr., Keith B. Brown, and Charles F. Coleman, Oak Ridge, Tenn., assignors to the United States of America as represented by the United States Atomic Energy Commission No Drawing. Application February 7, 1957
Serial No. 638,885

6 Claims. (Cl. 23—14.5)

Our invention relates to methods of recovering uranium values from uranium-bearing aqueous solutions and more particularly to an improvement in the Dapex process, a liquid-liquid extraction process for recovering uranium values using dialkylphosphoric acids as the extracting reagents.

There are several basic processes which have been used in the prior art for recovering uranium from aqueous solutions, including precipitation, ion-exchange resin sorption, and liquid-liquid extraction. There are advantages in the use of liquid-liquid extraction techniques; however, the range of applicability of some of the prior art extractants is limited by their low extraction power.

One object of our invention is to provide an improved method of using dialkylphosphoric acids as uranium extractants.

Another object of our invention is to provide a method of using dialkylphosphoric acids as uranium extractants which will permit the successful use of alkaline stripping reagents.

Another object of our invention is to provide a method of using dialkylphosphoric acids as uranium extractants which will increase their extraction power.

In accordance with our invention a process is provided for the recovery of uranium values from an aqueous acidic solution containing said values which comprises contacting said solution with a mixture comprised of a substantially water-immiscible diluent, a dialkylphosphoric acid having the formula

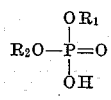

where $R_1$ and $R_2$ represent alkyl radicals, the total number of carbon atoms in said dialkylphosphoric acid being at least ten, and a minor proportion of a neutral organophosphorus compound selected from the group consisting of

and

where $R_3$, $R_4$, and $R_5$ are selected from the group consisting of alkyl and alkoxy radicals and alkyl and alkoxy radicals having at least one substituent selected from the group consisting of hydroxyl and chloro, and $R_6$, $R_7$, and $R_8$ represent alkoxy radicals, the total number of carbon atoms in said neutral organophosphorus compound being at least ten, whereby uranium values are transferred to the organic phase, and separating the resulting uranium-loaded organic phase from the remaining aqueous phase.

We have found that the combination of a neutral organophosphorus compound with a dialkylphosphoric acid shows much greater extraction power than can be accounted for by the cumulative extraction power of the individual reagents, i. e. the combination shows a strong synergistic enhancement of extraction.

Furthermore, when neutral organophosphorus compounds are present in the organic phase, extracted uranium values may be efficiently removed from the organic phase by the use of alkaline stripping reagents without the use of any other modifying agent. In the prior art it was necessary to add a small amount of a long-chain alcohol in order to prevent third phase formation during alkaline stripping.

In using our invention, the uranium-bearing aqueous acidic solution is contacted with the organic mixture comprised of a water-immiscible diluent, a dialkylphosphoric acid, and a neutral organophosphorus compound.

While we have found that undiluted mixtures of a liquid dialkylphosphoric acid and a neutral organophosphorus compound will extract uranium from aqueous acidic solutions, the extractants become viscous and difficult to handle, and we prefer to dissolve the extractants in a diluent which should have the following characteristics: (1) substantial immiscibility with the aqueous solution, (2) ability to dissolve the extraction reagent, its salts with ions encountered in extraction and stripping, and the extracted uranium complex, (3) freedom from interfering interaction with the extraction reagent, and (4) suitable density and viscosity for ready separation from the aqueous phase. We have found a wide variety of diluents to be suitable including the aliphatic hydrocarbons, aromatic hydrocarbons, aromatic petroleum fractions, and chlorinated hydrocarbons. Because of its low cost and desirable physical properties we prefer to use kerosene as a diluent.

The following table illustrates the increase in the extraction power of the dialkylphosphoric acids by the addition of a neutral organophosphorus compound.

TABLE I

*Synergistic extractions with several combinations of neutral organophosphorus compounds and dialkylphosphoric acids*

Aqueous phase: 1.5 molar $H_2SO_4$, 0.004 molar uranium.
Organic phase: 0.1 molar dialkylphosphoric acid, 0.1 molar neutral additive, kerosene diluent.
Aqueous : Organic phase ratio = 1.

| Neutral Additive | Uranium Extraction Coefficient $E_a^0$ | | | |
|---|---|---|---|---|
| | (a) | (b) | (c) | (d) |
| None | 9 | 5 | 2 | 0.2 |
| Tributylphosphate | 30 | 16 | 9 | 0.4 |
| Dibutyl butylphosphonate | 75 | 55 | 31 | 1.3 |
| Butyl dibutylphosphinate | 120 | 90 | 90 | 3.5 |
| Tributylphosphine oxide | 170 | 120 | 190 | 6.7 | a Di(n-octyl)phosphoric acid.
b Di(3,5,5-trimethylhexyl)phosphoric acid.
c Di(2-ethylhexyl)phosphoric acid.
d Bis(diisobutylmethyl)phosphoric acid.

The extraction coefficient, $E_a^0$, is a measure of the extraction power of a reagent and is defined as the ratio of the concentration of the uranium in the organic phase to the concentration of the uranium in the aqueous phase at equilibrium. In order to give an economical liquid-liquid extraction process the extraction coefficient should at least be in the range of one to ten and preferably above ten for processing dilute uranium solutions. The extraction coefficients of the neutral reagents listed in Table I when used alone under the conditions set forth in Table I are in the range of 0.0001 to 0.0002 except for tributylphosphine oxide which, although its extraction coefficient approaches unity, causes third phase formation when employed alone. As can be seen from the data in Table I, the addition of a neutral organophosphorus compound to a dialkylphosphoric acid extractant increases the uranium extraction power of the acid extractant to a marked degree.

Examples of other suitable dialkylphosphoric acid reagents which can be used in our process are di(1-methylheptyl)phosphoric acid, diisooctylphosphoric acid, di(2-ethyl-4-methylpentyl)phosphoric acid, and di(2-propyl-4-methylpentyl)phosphoric acid.

While any of the dialkylphosphoric acids of the above type are suitable for use in our process, we have found that compounds having seven to ten carbon atoms per chain with some branching close to the phosphorus atom, e. g., as an ethyl group on the second carbon atom, are exceptionally good uranium extractants and are preferred.

We have found that the concentration of the dialkylphosphoric acid is not critical, and that, in general, the uranium extraction coefficient increases with an increase in extractant concentration and is proportional to the square of the free acid reagent concentration. The upper limit of the concentration of uranium in the organic phase which can be achieved is limited by the stoichiometric requirement of two moles of acid reagent for each mole of uranium. Uranium concentrations in the order of 4 to 10 g. uranium per liter of organic phase can be readily achieved under conditions typical of process applications. We have found dialkylphosphoric acid concentrations from approximately .05 molar to approximately 0.4 molar to be suitable and concentrations from approximately 0.05 molar to approximately 0.2 molar are preferred.

The following table shows how a number of different neutral organophosphorus compounds increase the uranium extraction coefficient of a typical dialkylphosphoric acid.

TABLE II

*Synergistic extractions with di(2-ethylhexyl)phosphoric acid*

Aqueous phase: 0.004 molar uranium (VI).
Organic phase: 0.1 di(2-ethylhexyl)phosphoric acid, 0.1 molar additive, kerosene diluent.
Aqueous: Organic phase ratio=1.

[Uranium Extraction Coefficient $E_a^0$]

| Neutral Additive | 1.5 molar H₂SO₄ | | 0.5 molar SO₄, pH 1 | |
|---|---|---|---|---|
| | Additive Alone | Reagent Combination | Additive Alone | Reagent Combination |
| None | | 3 | | 110 |
| Phosphites: | | | | |
| Tributyl (83%) | 0.0001 | 12.1 | | |
| Tri(2-ethylhexyl) | 0.03 | 7.1 | 0.06 | 330 |
| Phosphates: | | | | |
| Tributyl | 0.00001 | 13 | 0.0002 | 470 |
| Tri(2-ethylhexyl) | 0.00002 | 5.2 | 0.0002 | 270 |
| Tri(n-amyl) | 0.00003 | 10 | | |
| Phosphonates: | | | | |
| Dibutyl butyl | 0.00001 | 37 | 0.0002 | 1,700 |
| Dihexyl hexyl | 0.0004 | 38 | | |
| Di(2-ethylhexyl) 2-ethylhexyl | 0.0001 | 17 | 0.0002 | 870 |
| Dibutyl chloromethyl | 0.00001 | 31 | | |
| Di(2-ethylhexyl) chloromethyl | 0.00001 | 19 | | |
| Dibutuyl benzene | 0.00001 | 14 | | |
| Diethyl 2-ethyl-1-hydroxyhexyl | 0.00001 | 11 | | |
| Phosphinates: | | | | |
| Butyl dibutyl | 0.0002 | 76 | 0.002 | 3,500 |
| Butyl dihexyl | 0.0006 | 76 | 0.0002 | 3,500 |
| Phosphine Oxides: | | | | |
| Tributyl | (ᵃ) | 140 | ᵇ 0.0025 | ᵇ 7,000 |
| Tri(2-ethylhexyl) | 0.0007 | 12 | 0.02 | 650 |
| Tri(n-octyl) | 1.34 | 72 | 0.06 | 3,500 |
| Tri(n-decyl) | 1.21 | 75 | | |
| Miscellaneous: Tri(2-ethylhexyl)phosphono acetate | 0.06 | 12 | | |

ᵃ 3rd phase—48% extracted.
ᵇ 0.05 molar reagent.

As can be seen from the data in Table II, the uranium extraction coefficient for the mixture of a dialkylphosphoric acid and a neutral organophosphorus compound is considerably higher than the sum of the extraction coefficients of the two reagents used separately.

Examples of other suitable neutral organophosphorus compounds which can be used in our process are: trilaurylphosphite, tridecylphosphite, trihexylphosphite, trioctylphosphite, trihexylphosphate, trioctylphosphate, tridecylphosphate, trilaurylphosphate, butyl dichloromethylphosphinate, 2-ethylhexyl dichloromethylphosphinate, and 2-ethylhexyl di(2-ethylhexyl)phosphinate.

We have found that the addition of very small amounts of the neutral organophosphorus compound will increase the uranium extraction coefficient of the dialkylphosphoric acid and that the uranium extraction coefficient continues to increase as the concentration of the neutral organophosphorus compound increases until a maximum is reached, after which addition of more neutral organophosphorus compound causes the uranium extraction coefficient to decrease. In general, suitable concentrations of the neutral organophosphorus compound are from approximately 0.02 molar to approximately 0.5 molar, and a preferred concentration is from approximately 0.05 molar to approximately 0.15 molar.

We measured the effect of temperature in the range of 25° C. to 50° C. on the uranium extraction coefficients of several mixtures of reagents and found that the extraction coefficient decreases with an increase in temperature. Even at 50° C., however, the extraction coefficients were sufficiently high for use in a practicable liquid-liquid extraction process. The temperature at which the extraction is carried out is thus not critical, at least up to 50° C. However, we prefer a temperature within the range 20° C. to 30° C.

Uranium can be extracted by our process from a variety of acidic solutions. Tables I and II give uranium extraction coefficients in the presence of an acidic sulfate solution. The following table gives the uranium extraction coefficients for a mixture of di(2-ethylhexyl) phosphoric acid and tributylphosphate from an aqueous solution of several other mineral acids.

TABLE III

*Extraction of uranium from several acidic solutions*

Aqueous phase: 0.004 molar uranium (VI) at the pH of the unbuffered acid.
Aqueous: Organic phase ratio=1.

| Acid | Acid concentration (molar) | Reagent | |
|---|---|---|---|
| | | (ᵃ) | (ᵇ) |
| HNO₃ | 0.4 | 240 | 1,000 |
| | 1.5 | 72 | 200 |
| | 4.0 | 33 | 88 |
| | 6.0 | 15 | 65 |
| HCl | 0.5 | 140 | 700 |
| | 1.5 | 13 | 68 |
| | 4.0 | 0.8 | 5 |
| | 6.0 | 0.15 | 2 |
| H₃PO₄ | 0.4 | 23 | 920 |
| | 1.4 | 0.8 | 2.6 |
| | ᶜ 3.3 | 0.11 | 0.3 |

ᵃ 0.1 molar di(2-ethylhexyl)phosphoric acid.
ᵇ 0.1 molar di(2-ethylhexyl)phosphoric acid plus 0.11 molar tributylphosphate.
ᶜ Uranium concentration in aqueous phase=0.0004 molar.

As can be seen from the data in Table III the uranium extraction coefficients in the presence of nitrate, chloride, and phosphate ions are high enough for a practicable liquid-liquid extraction process. Inasmuch as uranium can be extracted from any of these acids, the choice of acid to be used may be based on process considerations other than the uranium extraction coefficient.

In view of the extended use of sulfuric acid in uranium ore processing, and the high uranium extraction coefficients of our synergistic combination of reagents in the presence of sulfuric acid, our process is exceptionally useful in recovering uranium values from aqueous acidic sulfate solutions. We have found that the extraction of uranium from acidic sulfate solutions is somewhat sensitive to the sulfate concentration, and that the uranium extraction coefficient decreases with an increase in the sulfate concentration. Sulfate concentrations as high as approximately 1.5 molar can be tolerated, but the preferred sulfate concentration is less than one molar.

We have further found that the presence of the neutral organophosphorus compounds does not decrease the selectivity of the dialkylphosphoric acids for uranium over that of common contaminating ions and under some conditions will increase the selectivity of the dialkylphosphoric acids for uranium. The following table gives the extraction coefficients of a dialkylphosphoric acid used alone, and of the synergistic combination for metal values which may be present with uranium values.

TABLE IV

*Extraction of other metals*

Aqueous: 0.02 M metal ion (only one metal ion present in each test), 0.3–0.5 M $SO_4$, pH 1.2–1.4.
Aqueous: Organic phase ratio=1.

| Reagent | Extraction Coefficient | | | | |
|---|---|---|---|---|---|
| | V(IV) | Fe(III) | Al | Mo | Ti |
| Di(2-ethylhexyl)phosphoric acid (0.1 molar). | 0.7 | 3.1 | 0.01 | 3.4 | 5.9 |
| Di(2-ethylhexyl)phosphoric acid, 0.1 molar p us tributylphosphate (0.11 molar). | | 2.3 | | 2.5 | |
| Di(2-ethylhexyl)phosphoric acid (0.1 molar) plus dibutyl butylphosphonate (0.1 molar). | 0.8 | 1.7 | 0.01 | 4.9 | 2.5 |

As may be seen from the data in Table IV, the extraction power for several common contaminating metal ions is not changed to a marked degree by the presence of the neutral organophosphorus compound. For that reason the presence of the neutral organophosphorus compound not only increases the extraction power of the dialkylphosphoric acid for uranium but also may increase the degree of purification of uranium.

In general, the uranium extraction coefficient decreases with a decrease in pH of the acidic aqueous solution. We have found that the extraction step will work well over an initial pH range of from less than zero to approximately 2, and a preferred range for the initial pH is from approximately 1.0 to approximately 1.5. If the pH is lower than desired, it may in some cases be raised by the addition of a basic reagent such as a carbonate. Calcium carbonate may be used to precipitate calcium sulfate if it is desirable to lower the sulfate concentration as well as to raise the pH.

Iron in the ferric oxidation state is extracted with an appreciable extraction coefficient. However, when iron is in the ferrous oxidation state the extraction is low. For this reason, in the preferred embodiment of our process we reduce most ferric iron present by the addition of a reducing agent such as elemental iron.

After the extraction step, the uranium-loaded extractant is contacted with an aqueous phase containing a stripping agent.

The choice to be made from several suitable stripping methods may be arbitrary, or in some particular applications it may be indicated by particular process conditions or objectives.

Stripping with acids under some conditions, and in the presence of some reagents, is possible when using high acid concentrations, but acid stripping generally is not practicable under usual process conditions.

In the preferred embodiment of our process we use an alkaline stripping reagent. In the prior art, when it was desired to strip uranium values from a dialkylphosphoric acid reagent it was necessary to provide a small amount of a long chain alcohol in the organic phase in order to prevent the formation of a third phase.

We have found that the presence of the neutral organophosphorus reagent not only markedly increases the extraction coefficient of the dialkylphosphoric acid extractant but also prevents the formation of a third phase during alkaline stripping, so that an alcohol additive is generally not required in our process.

The minimum concentration of neutral organophosphorus compound needed to prevent third phase formation is determined by the concentration of the dialkylphosphoric acid, increasing with an increase in the concentration of dialkylphosphoric acid. For dialkylphosphoric acid concentrations in the range of 0.1 molar to 0.4 molar, the minimum concentration of neutral organophosphorus acid ranges from 0.05 molar to 0.2 molar. In order to take care of process variations it is generally desirable to maintain the concentration of the neutral organophosphorus compound above such minimum concentration. At concentrations of dialkylphosphoric acid likely to be used under process conditions, the preferred concentration range of neutral organophosphorus compound to prevent third phase formation is from approximately 0.05 molar to approximately 0.1 molar.

When stripping with an alkaline reagent, the carbonate or hydroxide may be used. We prefer to use carbonate, which may suitably be furnished as sodium or ammonium carbonate. A wide range of concentrations can be used, e. g., from 0.2 molar to 1.5 molar sodium carbonate, but we prefer to use concentrations between 0.5 and 1.0 molar. The use of higher concentrations may incur some disadvantage by limiting the solubility of the sodium uranyl tricarbonate. Uranium enters the aqueous stripping solution as the uranyl tricarbonate ion, and can be recovered in product form by method well known to the art.

If an hydroxide is used as the stripping agent, the uranium precipitates as the diuranate and can be recovered in product form by well-known methods. Sodium hydroxide and ammonium hydroxide are suitable reagents, and we prefer to use sodium hydroxide. A wide range of concentrations can be used, e. g., from less than 0.5 molar to over 4 molar sodium hydroxide.

Contacting the aqueous and organic phases in the extraction step and in the stripping step may be accomplished in mixer-settlers, pulse columns, or any other suitable liquid-liquid contactor. The contact may be made in countercurrent or cocurrent fashion.

The extractant and stripping reagents may be recycled or discarded after one use.

Having thus described our invention, the following example is offered to illustrate our invention in greater detail:

EXAMPLE I

The uranium extraction is carried out in an extraction section comprised of four mixer-settler stages, and the stripping is carried out in a stripping section comprised of three mixer-settler stages.

24,000 pounds of ore containing 72 pounds of $U_3O_8$ are leached for four hours with 2600 pounds of 98% $H_2SO_4$ diluted to 3000 gallons. The resulting leach liquor is clarified by countercurrent decantation and totals 6000 gallons in volume with an analysis of 1.37 g. $U_3O_8$, 5 g. Fe, 4 g. Al, 1 g. V, and 50 g. $SO_4$ per liter plus small concentrations of numerous other anions and cations. The pH of the clarified leach liquor is approximately 0.8. This liquor is transferred to the extraction section where it is passed countercurrent to a stream of 0.1 molar di(2-ethylhexyl)phosphoric acid and 0.1 molar tributylphosphate dissolved in kerosene. The total organic phase flow is 1750 gallons.

The uranium-bearing organic phase is passed to the stripping section where it is contacted countercurrently with 137 gallons of 1.0 molar $Na_2CO_3$ solution. The uranium-barren organic phase leaving the stripping section is recycled to the extraction section.

Dilute sulfuric acid is added to the uranium-loaded aqueous strip solution to pH 1.5 and the solution is boiled to expel carbon dioxide. The uranium is precipitated as sodium and ammonium diuranates by addition of anhydrous ammonia to pH 7. The precipitate is filtered, washed and dried to give the uranium product, which assays 82% $U_3O_8$ and contains 68.3 pounds of $U_3O_8$.

The foregoing description and example are not intended to restrict our invention and it should be construed as limited only to the extent indicated by the appended claims.

Having thus described our invention we claim the following:

1. A process for the recovery of uranium values from an aqueous acidic solution containing said values which comprises contacting said solution with an organic mixture comprised of a substantially water-immiscible diluent, a dialkylphosphoric acid having the formula $$R_2O-\underset{\underset{OH}{|}}{\overset{\overset{OR_1}{|}}{P}}=O$$

where $R_1$ and $R_2$ represent alkyl radicals, the total number of carbon atoms in said dialkylphosphoric acid being at least ten, and a neutral organophosphorus compound selected from the group consisting of $$R_4-\underset{\underset{R_5}{|}}{\overset{\overset{R_3}{|}}{P}}=O$$

and $$R_7-\underset{\underset{R_8}{|}}{\overset{\overset{R_6}{|}}{P}}$$

where $R_3$, $R_4$, and $R_5$ are selected from the group consisting of alkyl and alkoxy radicals, and alkyl and alkoxy radicals having at least one substituent selected from the group consisting of hydroxyl and chloro, and $R_6$, $R_7$, and $R_8$ represent alkoxy radicals, the total number of carbon atoms in said neutral organophosphorus compound being at least ten, whereby uranium values are transferred to the organic phase, and separating the resulting uranium-loaded organic phase from the remaining aqueous phase.

2. The process of claim 1 wherein the concentration of the dialkylphosphoric acid in the organic mixture is in the range of from approximately 0.05 molar to approximately 0.4 molar.

3. The process of claim 2 wherein the concentration of the neutral organophosphorus compound in the organic mixture is in the range of from approximately 0.02 molar to approximately 0.5 molar.

4. A process for the recovery of uranium values from an aqueous acidic solution containing said values which comprises contacting said solution with an organic mixture comprised of a substantially water-immiscible diluent, a dialkylphosphoric acid having the formula $$R_2O-\underset{\underset{OH}{|}}{\overset{\overset{OR_1}{|}}{P}}=O$$

where $R_1$ and $R_2$ represent alkyl radicals, the total number of carbon atoms in said dialkylphosphoric acid being at least ten, and a neutral organophosphorus compound selected from the group consisting of $$R_4-\underset{\underset{R_5}{|}}{\overset{\overset{R_3}{|}}{P}}=O$$

and $$R_7-\underset{\underset{R_8}{|}}{\overset{\overset{R_6}{|}}{P}}$$

where $R_3$, $R_4$, and $R_5$ are selected from the group consisting of alkyl and alkoxy radicals, and alkyl and alkoxy radicals having at least one substituent selected from the group consisting of hydroxyl and chloro, and $R_6$, $R_7$, and $R_8$ represent alkoxy radicals, the total number of carbon atoms in said neutral organophosphorus compound being at least ten, whereby uranium values are transferred to the organic phase, and separating the resulting uranium-loaded organic phase from the remaining aqueous phase, contacting said uranium-loaded organic phase with an aqueous phase containing ions selected from the group consisting of carbonate and hydroxide ions, whereby extracted uranium values are transferred to the alkaline aqueous phase, and separating the resulting uranium-loaded aqueous phase from the remaining organic phase.

5. The process of claim 4 wherein the aqueous phase brought into contact with the uranium-loaded organic phase contains carbonate ions in the concentration range from approximately 0.2 molar to approximately 1.5 molar.

6. A process for the recovery of uranium values from a uranium-bearing ore which comprises leaching the uranium values from said ore with sulfuric acid, contacting the resulting leach liquor with an organic mixture comprised of kerosene, a dialkylphosphoric acid having the formula $$R_2O-\underset{\underset{OH}{|}}{\overset{\overset{OR_1}{|}}{P}}=O$$

where $R_1$ and $R_2$ represent alkyl radicals, the total number of carbon atoms in said dialkylphosphoric acid being at least ten, and a neutral organophosphorus compound selected from the group consisting of $$R_4-\underset{\underset{R_5}{|}}{\overset{\overset{R_3}{|}}{P}}=O$$

and $$R_7-\underset{\underset{R_8}{|}}{\overset{\overset{R_6}{|}}{P}}$$

where $R_3$, $R_4$, and $R_5$ are selected from the group consisting of alkyl and alkoxy radicals and alkyl and alkoxy radicals having at least one substituent selected from the group consisting of hydroxyl and chloro, and $R_6$, $R_7$, and $R_8$ represent alkoxy radicals, the total number of carbon atoms in said neutral organophosphorus compound being at least ten, whereby uranium values are transferred to the organic phase, separating the resulting uranium-loaded organic phase from the remaining leach liquor, contacting the separated organic phase with an aqueous phase containing ions selected from the group consisting of carbonate and hydroxide ions, whereby extracted uranium values are transferred to the alkaline aqueous phase, and separating the uranium-loaded alkaline aqueous phase from the depleted organic phase.

References Cited in the file of this patent

UNITED STATES PATENTS

| | | |
|---|---|---|
| 2,717,696 | Schubert | Sept. 13, 1955 |
| 2,769,686 | McCullough et al. | Nov. 6, 1956 |

UNITED STATES PATENT OFFICE
CERTIFICATE OF CORRECTION

Patent No. 2,859,094                                                   November 4, 1958

John M. Schmitt et al.

It is hereby certified that error appears in the printed specification of the above numbered patent requiring correction and that the said Letters Patent should read as corrected below.

Column 3, line 66, Table II, under the heading "0.5 molar $SO_4$, pH 1", and under the subheading "Additive Alone", for the figure given for butyl dihexyl phosphinates, for "0.0002" read -- 0.002 --; column 8, lines 49 and 50, for that portion of the formula reading "$R_6$" read -- $R_8$ --.

Signed and sealed this 26th day of May 1959.

(SEAL)
Attest:
KARL H. AXLINE
Attesting Officer

ROBERT C. WATSON
                                                                    Commissioner of Patents